United States Patent [19]

Johnson, Jr.

[11] 3,725,236
[45] Apr. 3, 1973

[54] ELECTROCHEMICAL OXYGEN DEMAND APPARATUS

[75] Inventor: Justin O. Johnson, Jr., Levittown, Pa.

[73] Assignee: Honeywell Inc., Minneapolis, Minn.

[22] Filed: Sept. 24, 1970

[21] Appl. No.: 75,438

[52] U.S. Cl. ............... 204/195 R, 204/1 T, 204/129, 204/266
[51] Int. Cl. ............................................. G01n 27/46
[58] Field of Search ............... 204/1 T, 129, 195, 230

[56] References Cited

UNITED STATES PATENTS

| | | | |
|---|---|---|---|
| 1,230,803 | 6/1917 | Sebille | 204/230 |
| 2,773,497 | 12/1956 | Anzi et al. | 204/195 |
| 2,927,888 | 3/1960 | Beard | 204/195 |
| 3,045,665 | 7/1962 | Moyat | 204/129 |
| 3,256,164 | 6/1966 | Donohue et al. | 204/129 |
| 3,330,755 | 7/1967 | Mahany | 204/230 |
| 3,411,998 | 11/1968 | Wallman et al. | 204/129 |
| 3,527,687 | 9/1970 | Subbotin | 204/230 |

Primary Examiner—T. Tung
Attorney—Arthur H. Swanson, Lockwood D. Burton and Mitchell J. Halista

[57] ABSTRACT

A non-biological method of exhaustive electrochemical oxidation utilizing an apparatus for forming oxygen in an aqueous sample through exhaustive electrolysis by a current flow between a pair of electrodes to oxidize the organic material in the sample in combination with an electrochemical oxidation of the organic material at an electrode immersed in the sample. The separate products of the electrolysis at the respective electrodes are collected, and the partial pressures thereof are measured by a differential pressure measuring means to provide an indication of the oxygen demand when correlated with an electrolysis of a reference fluid sample.

9 Claims, 2 Drawing Figures

INVENTOR.
JUSTIN O. JOHNSON, JR.

BY *Mitchell J. Halista*

ATTORNEY.

3,725,236

ELECTROCHEMICAL OXYGEN DEMAND APPARATUS

Subject matter which may be shown but not claimed herein is shown and claimed in the patent application of John P. Cummings, Ser. No. 58,448, filed on July 27, 1970 and assigned to the same assignee as the present invention and in the patent application of John P. Cummings and Richard E. Berg, Ser. No. 58,254, filed on July 27, 1970 and assigned to the same assignee as the present invention.

BACKGROUND OF THE INVENTION

The oxygen demand of a water system is the most important water quality parameter currently used to monitor the effectiveness of treatment of sanitary and other industrial plant effluents. A detailed discussion of this subject matter can be found in the book entitled "Standard Methods for the Examination of Water and Waste Water" by the American Public Health Assoc., 11th edition, New York, 1960. The oxygen demand or the amount of dissolved oxygen required for stabilization of dissolved organic material, has been historically measured by means of the so-called 5-day biochemical oxygen demand (BOD) test. In essence, the test measures the oxygen consumed by bacteria during their normal metabolic processes on dissolved and biologically unstabilized organic matter. Normally, 20 days are required for complete stabilization, but this incubation period has been shortened to 5 days in the BOD test which is the minimum incubation period necessary for reproducible results to be obtained.

From a process control standpoint, this five day incubation is untenable. To overcome this disadvantage, several well-known non-biological tests have been introduced. Basically these tests are similar to the aforesaid BOD test, differing only in the choice of oxidizor. When a combustion with oxygen is used in these prior art tests, the test is called the total oxygen demand (TOD) test or total organic carbon (TOC) test, depending upon the reaction product being monitored. With carbon dioxide as the oxidizor, the test is called the $TCO_2D$ test and, finally, with a vigorous chemical oxidizor the test is called the chemical oxygen demand (COD) test. Each of these prior art tests possesses certain technological advances over the classical BOD test, principally a shorter test time, but they also have certain inherent disadvantages. The major disadvantage is their inability to distinguish between biodegradible and non-biodegradible organic materials. Another disadvantage is the high cost of the test in terms of time and equipment, which cost often cannot be absorbed by many small water treatment plants. Accordingly, what is needed is a non-biological method which would yield data comparable to the 5 day BOD test in evaluating the oxygen demand load of a water system while reducing the test time and providing continuous monitoring with reasonably simple instrumentation to provide a low cost test system.

An object of the present invention is to provide a non-biological method of determining the oxygen demand of a water system.

Another object of the present invention is to provide a non-biological method of determining the oxygen demand of a water system based on an exhaustive electrochemical oxidation.

A further object of the present invention is to provide a non-biological electrochemical method of determining the oxygen demand load of a water system and utilizing an apparatus having a simple instrumentation and construction.

SUMMARY OF THE INVENTION

In accomplishing these and other objects there has been provided, in accordance with the present invention, a non-biological method of exhaustive electrochemical oxidation utilizing an apparatus for forming oxygen through exhaustive electrolysis to serve as the mechanism for oxidizing the organic material in a fluid test sample. The products of the electrolysis are collected and measured by a differential pressure meter indicating the difference in partial pressures between the two gaseous byproducts.

BRIEF DESCRIPTION OF THE DRAWINGS

A better understanding of the present invention may be had when the following detailed description is read in conjunction with the accompanying drawings in which.

DETAILED DESCRIPTION

Figure 1:
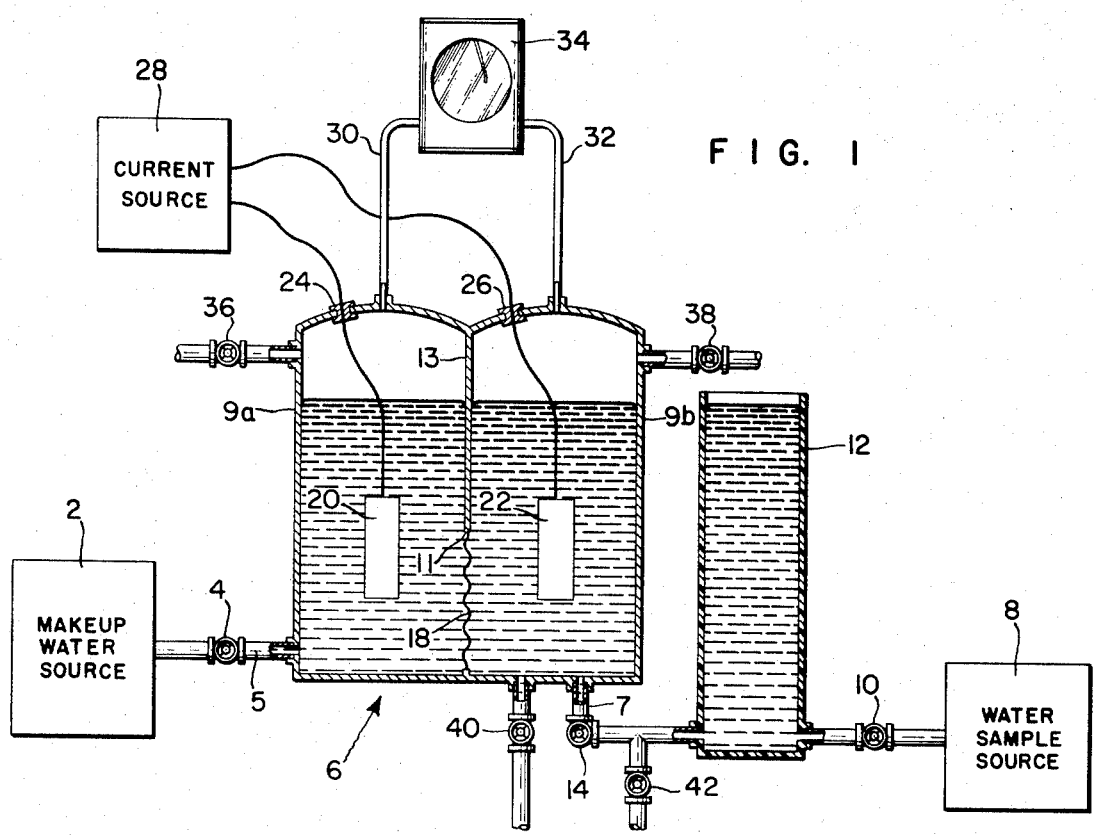
FIG. 1 is a pictorial diagram of an exhaustive electrochemical oxygen demand system embodying the present invention.

In FIG. 1, there is shown an exemplary apparatus embodying the present invention for performing an electrochemical oxygen demand, i.e., EOD, test including a source of makeup water 2 used to supply a standard water sample through a first inlet valve 4 to a first intake pipe 5 of a test apparatus 6. A source 8 of an aqueous sample to be tested is arranged to be connected through a second inlet valve 10 to the bottom of a standpipe 12. An outlet from the bottom of the standpipe 12 is connected through a second inlet valve 14 to a second intake pipe 7 of the test apparatus 6. The test apparatus 6 includes a pair of adjacent similar fluid chambers, or compartments, 9a and 9b having a port 11 formed in a common wall 13 therebetween. A semi-permeable membrane 18 is arranged to cover the port 11 to prevent a physical mixing of the fluids contained in the compartments 9 and 11. The membrane 18 may be any suitable commercially available ion exchange membrane such as that material identified as AMC-3470-XL Cation Exchange and available from Ionac Chemical Co. of Birmingham, New Jersey. A first electrode, or cathode, 20 is suitably supported and arranged in the first chamber 9a which is to be used to contain the reference water supplied from the source 2. A second electrode, or anode, 22 is similarly positioned in the second chamber 9b to be used to contain the aqueous sample supplied from the test sample source 8. The electrodes 20 and 22 may be any suitable material having a good electrical conductivity while being substantially chemically inert in the aqueous sample to be tested. For example, the electrodes 20 and 22 may be made of platinum, gold, iridium, rhodium, silver or nickel with nickel being a preferred material oweing to its superior performance. A suitable nickel electrode is one of "Fuel Cell Grade", available from Texas Instrument Co. of Dallas, Texas.

The electrodes are connected through the walls of the chamber by means of fluid-tight electrical connections 24 and 26 to respective output terminals of a constant current source 28. The two chambers of the test apparatus are, also, connected by respective ones of capillary tubing 30 and 32 to respective sides of a differential pressure apparatus 34. A pair of exhaust, or vent, valves 36 and 38 are arranged to exhaust the space above a fluid level in the respective compartments of the test apparatus 6 while a pair of fluid discharge valves 40 and 42 are used to drain the second chamber 9b and the standpipe 12, respectively. The exhaust valves 36 and 38 are preferably ganged for concurrent operation to provide barometric pressure compensation for the test system, as discussed hereinafter. The differential pressure measuring apparatus 34 may be any suitable well-known device capable of measuring and indicating the differential pressure of a pair of pressure input signals applied thereto, e.g., a differential pressure gauge. Inasmuch as the details of this device do not form a part of the invention a further description thereof has been omitted. quantitative The operation of the present invention, utilizing an exhaustive electrolysis technique, consists essentially of electrolyzing the aqueous test sample until the electrochemically active material is either quantitatively removed from the solution or is changed to an inactive form. In other words, during the exhaustive electrolysis, the electrical current from the current source 28 is passed in a predetermined direction between the electrodes 20 and 22 whereby oxygen is produced at the anode electrode 22 with hydrogen being evolved at the cathode electrode 20. When organic materials are present in the test fluid sample, they react with the oxygen produced at the anode and little gaseous oxygen is left over to be measured by the differential pressure apparatus 34. On the other hand, with no organic material in the test solution, a quantitative, i.e., predictable, amount of gaseous oxygen is evolved to produce a gaseous pressure for measurement by the measuring apparatus 34. The oxygen demand of a contaminated, i.e., containing organic matter, fluid sample is, therefore, related to the difference between the quantititative oxygen partial pressure and the partial pressure observed after electrolysis of the test fluid sample. In this operation, the technique of the present invention involves the passage of sufficient electrical current in the aforesaid predetermined direction between the electrodes 20 and 22 to render the test solutions substantially electro-inactive, or at least until a stable reaction rate is achieved. The test solutions are deemed to be substantially electro-inactive when the current input to the cell delivers the theoretical quantity of evolved gaseous oxygen, according to Faraday's Law. His law, simply stated, is that the amount of product formed by electrolysis is directly proportional to the amount of electricity flowing. The proportionality, or Faraday, constant of 96,520 ampsecs is the quantity of charge which will liberate one equivalent weight of material at an electrode-solution interface. The determinations are obtained by adjusting the anode potential to a value sufficient to produce gaseous oxygen in the aqueous test sample. Under these conditions the potential is sufficiently high to drive any possible organic electrode reactions to substantial completion. The general reactions possible at the anode are:

A. The oxidation of water or hydroxyl ions to oxygen;

B. The electrochemical oxidation of any organic material present in the aqueous sample into various products;

C. The electrolytic treatment of inorganic substances which may be present in the sample.

In practicing the operation of the present invention, the electrical power from the source 28 is coupled to the anode and cathode to deliver a predetermined quantity of electrolyzing current in a predetermined direction between the electrodes at a suitable potential level. The electrical power supply means 28, accordingly, contributes to three simultaneous reactions; the first being the generation of oxygen by electrolysis, a portion of which will combine directly with the organic products present in the test solution; the second being the electro-oxidation of organic products by reactions occurring at the anode electrode 22; the third being the electrode surface performing an oxidizing function under the reaction conditions.

Differential pressure measuring means 34 are provided in association with the anode and cathode compartments 9a, 9b for determining the difference between partial pressures, or evolution rate, of the gaseous products, e.g., oxygen and hydrogen, upon delivery of the predetermined quantity of electrolyzing current. This differential pressure, which in the exemplary apparatus is dependent upon the oxygen and hydrogen partial pressure, therefore provides an indication of that portion of a total power input which has contributed to the oxidation of organic waste products present in the test fluid sample. In order to achieve reproducible results, it has been found that an alkali metal hydroxide, such as potassium hydroxide (KOH), should be added to the sample undergoing oxygen demand determination, the quantity being sufficient to achieve a pH in excess of about ten. The alkali metal hydroxide combines with the evolved carbon dioxide in the sample undergoing determination, and thereby provides a more precise determination of evolved oxygen content without an error due to the carbon dioxide partial pressure. Additionally, the reference water in the first compartment 9 may be alkanized with KOH to increase its electrical conductivity.

The test method of the illustrated embodiment of the present invention consists of electrolyzing the test fluid solution for a fixed period of time, e.g., approximately 30 minutes. It should be appreciated, of course, that a greater period of time can be utilized, if desired, for electrolyzing the test fluid solution for a more complete electrolysis pursuant to the general operative aspects of the present invention. The aforesaid electrochemical oxidation is obtained by adjusting the anode potential to a value sufficient to produce gaseous oxygen while hydrogen is being evolved at the cathode 20.

The fundamental principles underlying the operation of the present invention can be explained on the basis of the competing reactions in the aqueous test sample. If an oxidizing current is passed through a simple electrolytic solution in the absence of electroactive material, gaseous oxygen will be produced at the anodic reaction. For every four electrons passed through the cell, one molecule of gaseous oxygen is produced. Therefore, a relationship exists between the number of electrons passed and the amount of oxygen produced according to Faraday's Law, as previously discussed. In the event that an electro-active organic material is present, electrons can also be transferred from the material to the anode 22. If the same number of electrons are transferred as before, a smaller amount of oxygen will be evolved since the electrons are furnished to the anode 22 by the two concurrent reactions.

In the present technique, therefore, a fixed number of electrons (a known coulombic input) are passed between the electrodes 20 and 22 through the reference fluid and the sample test. The ion-exchange membrane 18 covering the port 11 between the chambers 9a and 9b provides an electrolytic bridging medium for conduction of the electrical current between the electrodes 20 and 22 while physically isolating, i.e., preventing mixing, of the fluids contained in the chambers 9a and 9b. By a previous calibration with pure water in both chambers, such as distilled water the difference between the hydrogen and oxygen partial pressures at constant volume is determined for this coulombic input. The oxygen demand of the sample containing organic waste products is related to the difference in oxygen partial pressure as represented by the differential pressure observed with an without the organic material present. The differential pressure measuring apparatus 34 is used to monitor the differential partial pressures within the two chambers 9a and 9b until the reaction is substantially complete. This can be accomplished by either electrolyzing for a period of time known to be in excess of the coulombic input necessary to complete the reaction, or by passing the current through the cell unit the rate of oxygen production is equivalent to that of the calibration step. As the oxygen demand of a sample increases, the difference between the calibration pressure and the observed pressure with the organic waste material present also increases.

As previously discussed, for purposes of uniformity the test fluid sample is preferably in a solution of 1N KOH, this solution providing a pH in excess of ten, i.e., moderately alkaline. The KOH acts as a means for combining with the gaseous $CO_2$ generated in the oxidizing reactions of the organic material present in the aqueous test sample; and, hence, the partial pressure of $CO_2$ is not involved in the determination of the differential partial pressure by the meter apparatus 34. In summary, in the absence of organic waste materials, the cell output of gaseous oxygen is at a maximum, since all electrical current passing through the cell is utilized to generate oxygen. It should be noted that in this and all other discussions of the operation of the present invention, a constant hydrogen generation rate is assumed and the hydrogen partial pressure is applied to the measuring apparatus 34. WIth organic waste material present in the test solution, such as the constituents found in waste effluence, the rate of gaseous oxygen production would drop to a lower value due to the occurrence of the competitive reactions discussed above. Accordingly, the difference between the rate of oxygen production with the sample and a calibration run as indicated by the differential partial pressure shown by the differential pressure indicating apparatus 34 is related to the quantity of organic material present in the test solution.

The steps for operating the apparatus of the present invention involve an initial filling of the two chambers 9a and 9b with a reference water sample and a test fluid sample respectively. The amount of the water sample in the first compartment 9a must be measured precisely to determine an above-liquid volume and to cover the cathode electrode 20 to provide an electrical conducting path within the first chamber 9a between the membrane 18 and the electrode 20. The inlet valve 4 is opened during the initial filling of the first chamber 9a to allow the reference water from the source 2 to enter the first chamber 9a and is closed at the completion of this filling.

On the other hand, the filling of the second compartment 9b with a test fluid is done in a manner to assure that each sample to be tested is represented by substantially the same volume of liquid whereby the results of successive oxygen demand tests are capable of being correlated for a constant volume sample. In order to fill this second chamber 9b, the drain valves 40 and 42 are closed while the intake valves 14 and 10 are opened to allow the fluid sample from the source 8 to flow into the standpipe 12 and the second chamber 9b. Inasmuch as the fluid in the standpipe and chamber 10 will seek the same level, the standpipe 12 provides an accurate indication of the level of the fluid sample in the second chamber 9b. During the aforesaid filling processes of the first and second compartments 9a and 9b, the exhaust valves 36 and 38 are kept open to effect a venting of the space in the chambers 9a and 9b, respectively, above the fluid levels therein whereby an excessive internal pressure in the system is not developed. After the second chamber 9b, has been filled to the required level, as indicated by the level in the standpipe 12, the intake valves 14 and 10 are closed. The second drain valve 42 may be opened at this time if it is desired to drain all of the old sample fluid from the sample intake system before adding a new sample fluid for the next test.

After the filling of the compartments 9a and 9b, the exhaust vents 36 and 38 are closed, and the current from the source 28 is turned on for the required length of time. At the conclusion of an EOD test and a recording of the indication of the measuring apparatus 34, the current is turned off, the exhaust valves 36 and 38 are opened and the drain valve 40 is opened to drain the test fluid from the second compartment 9b. Further operation of the apparatus of the present invention for subsequent EOD tests would involve the maintenance of the reference water level by means of valve 4 and the introduction of a new test fluid sample from the source 8 by means of the valves 14 and 10 as discussed above.

The differential pressure of the gases evolved during the test as communicated through the capillaries 30 and 32 is indicated on the scale of the differential pressure meter 34. The internal gas storage capacities of the two sides of the differential pressure meter 34 are arranged to accommodate the evolution rate of the oxygen and hydrogen from the compartments 9a and 9b, respectively. In other words, the volume of an internal chamber of the differential pressure meter 34 connected to the first compartment 9a is arranged to be approximately twice that of the volume of an internal chamber connected to the second compartment 9b in accordance with the conventional evolution rate of the hydrogen and oxygen from the water. Thus, if water is present in both chambers 9a and 9b without any organic material therein the differential pressure meter 34 will indicate a differential pressure of substantially zero as an indication that plain water is being hydrolized in both compartments.

It can be seen from the arrangement of the apparatus of the present invention that the ion exchange membrane 18 does not have to support the full static pressure developed in any one chamber but only the differential pressure which will usually be substantially less. Thus, the durability of the cell is substantially increased over the systems shown in the aforesaid copending applications. Further, the structure of the present invention lends itself to a more compact physical arrangement of the chambers 9a and 9b, e.g., the second chamber 9b can be located concentrically within an outer annular arrangement for the first chamber 9a. Additionally, since both of the vent valves 36 and 38 which are being used to communicate atmosphere pressure to the inside of the testing system are preferably ganged together for concurrent operation, the system is inherently compensated for barometric pressure changes. Thus, the system is initially stabilized at a common barometric pressure and operates thereafter as a closed system during the EOD test with both exhaust valves 36 and 38 being closed.

A further modification of the apparatus may be provided to insure that no vapor condenses either in the internal measuring chambers of the differential pressure apparatus 34 or the capillaries 30 and 32. This modification is achieved by enclosing the apparatus 34 within a thermostatically controlled cabinet. The purpose of this additional structure is to keep the measuring volume within the apparatus 34 at a constant temperature under ambient external conditions and, if maintained higher than any expected ambient temperature, to remove any condensed fluid from the capillaries 30 and 32, when the exhaust valves 36 and 38 are opened, by blow-back of the collected gases from the interior of the gauge 34 through the capillaries 30 and 32 to maintain an unrestricted internal gas flow in the system for subsequent EOD tests.

Figure 2:
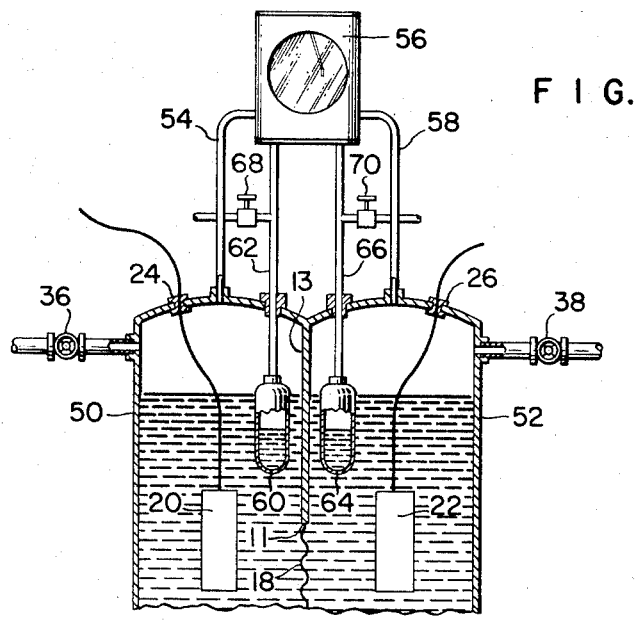
FIG. 2 is a pictorial diagram of a modification of a portion of the system shown in FIG. 1.

In FIG. 2 there is shown a modification of the structure of the invention illustrated in FIG. 1. Similar reference numerals are used in FIG. 2 to indicate elements common to the embodiments of FIGS. 1 and 2. The entire apparatus of FIG. 1 has not been reproduced in FIG. 2 for simplicity of illustration, and it is assumed that the remainder of the structure of the apparatus for FIG. 2 is substantially identical to that shown in FIG. 1. A first fluid enclosure, or compartment 50 is arranged to contain a sample of a reference fluid and a cathode element 20, while a second fluid enclosure, or compartment 52 provides a container for a test fluid sample and an anode 22. The anode 22 and the cathode 20 are connected to a suitable current source (not shown) by a pair of wires passing through respective fluid-tight electrical connections 24, 25. The first compartment 50 is connected by a first capillary tube 54 to one side of a suitable differential pressure measuring apparatus 56, while the second compartment 52 is connected by a second capillary tube 58 to the other side of the differential pressure measuring apparatus 56. A temperature compensating system for each fluid sample is, also, connected to the measuring apparatus 56 to compensate the differential pressure measurement made by the apparatus 56 for the variations in temperature of the fluids contained in the compartments 50 and 52. Specifically, a first fluid-tight bulb 60 having a measured amount of fluid, e.g., water, therein is connected by a third capillary tube 62 to the differential pressure measuring apparatus 56. Similarly, a second fluid-tight bulb 64 also having a measured amount of fluid, e.g., water therein is connected by a fourth capillary tube 66 to the pressure measuring apparatus 56. The first bulb 60 is arranged to be immersed in the fluid within the first compartment 50, and the second bulb 64 is immersed in the fluid within the second compartment 52. A first vent valve 68 is provided for the first capillary tube 62, and a corresponding second vent valve 70 for the second capillary tube 66. Exhaust valves 36 and 38 are, also, provided for the enclosures 50 and 52, respectively, in a manner similar to that described above with respect to FIG. 1.

The operation to the apparatus shown in FIG. 2 is substantially similar to that of the apparatus illustrated in FIG. 1 and previously discussed with respect to the measurement of the oxygen demand of the test fluid sample by electrochemical means involving the electrolysis of the fluid sample achieved by passing an electrical current between the electrodes 20 and 22. The purpose of the two temperature compensating bulbs 60 and 64, of the embodiment shown in FIG. 2, is to provide respective compensating gas pressures within the capillary tubes 62 and 66 which pressures are effected by the temperature of the respective external fluids contacting the bulbs 60 and 64. Specifically, the application of these compensating gas pressures to the pressure measuring apparatus 56 by means of the capillary tubes 62 and 66 is arranged to offset possible errors in the measurement of the partial pressure of the evolved hydrogen and oxygen in the capillary tubes 54 and 58 derived from temperature changes of their respective fluid sources, i.e., the fluids in the compartments 50 and 52. Briefly, the effective volume of the fluid within a bulb is set at an arbitrary level with the temperature of the fluid determining the gas pressure above the fluid in the bulb since the bulb and the attached capillary form a closed system. Thus, the intimate contact of the fluid in the bulb with the fluid in which it is immersed will result in the temperatures of the two fluids being substantially equal, and if the vapor pressures above the bulb liquid and the external fluid are initial substantially equal the vapor pressures above the fluids will continue to be substantially equal regardless of temperature changes. The vapor pressures from the bulbs 60, 64 are connected by respective capillary tube 62, 66 to the differential pressure measuring apparatus 56 to offset, in a well-known manner, the effect of a temperature induced change in the vapor pressure in the first and second capillaries 54, 58, respectively.

The vent valves 68 and 70 allow atmosphere pressure to be introduced into the capillary tubes 62 and 66 at the same time that atmospheric pressure is being introduced into the compartments 50 and 52 by the exhaust valves 36 and 38. The vent valve 68 and 70 may be ganged with the exhaust valves 36 and 38, respectively, to assure that the barometric pressure in the capillary tubes 62 and 66 is initially equalized with the pressure within the compartments 50 and 52 during the filling of the compartments 50 and 52. After the compartments 50 and 52 are filled and before the EOD test is commenced, the exhaust valves 36, 38, and the vent valves 68, 70 are closed to seal the interior of the apparatus from external atmospheric pressure changes. Thus, the barometric pressures within the compensating capillaries 62 and 66 which are initially equal to the barometric pressures in the enclosures 50 and 52 will track, i.e., follow, temperature induced pressure changes in the enclosures 50 and 52 throughout the EOD testing process. In other words, only the differential changes in partial pressures produced by the gaseous by-products evolved from the EOD test are indicated by the measuring apparatus 56 since any temperature effects on the initial barometric pressures within the compartments 50 and 52 are cancelled by the effect of the compensating pressures in the capillaries 62 and 66.

Thus, it may be seen that there has been provided, in accordance with the present invention, a non-biological electrochemical method and apparatus of determining the oxygen demand load of a water system utilizing a compact measuring apparatus including means for compensating the measurement of the oxygen demand load for temperature changes in the sample fluid being tested.

The embodiments of the invention in which an exclusive property or privilege is claimed are defined as follows:

1. A system for the determination of oxygen demand in test fluid samples, comprising:
   cell means for receiving a quantity of a test fluid sample and a reference fluid, said cell means including an anode enclosure arranged to receive and store the test fluid sample, means in said anode enclosure for supporting an anode therein, a cathode enclosure arranged to receive and to store the reference fluid, and means in said cathode enclosure for supporting a cathode therein,
   first fluid admitting means connected to said anode enclosure for admitting a test fluid into said anode enclosure, and second fluid admitting means connected to said cathode enclosure for admitting a reference fluid into said cathode enclosure,
   a pair of spaced electrodes disposed within said cell including an anode within said anode enclosure and a cathode within said cathode enclosure,
   a communicating port connecting said anode enclosure and said cathode enclosure and being located at a level below the level of fluid contained within said anode and cathode enclosures,
   selectively permeable means disposed across said port for electrolytically coupling said electrodes in said cell while preventing mixing of the test fluid and the reference fluid,
   mean for coupling electrical power to said anode and cathode from a source arranged to deliver a quantity of electrolizing current between said electrodes at a potential level suitable for generating oxygen in said anode enclosure by electrolysis of the test fluid sample and hydrogen in said cathode enclosure by electrolysis of the reference fluid sample,
   first tubing means separate and distinct from said first fluid admitting means and connected to said anode enclosure,
   second tubing means separate and distinct from said second fluid admitting means and connected to said anode enclosure,
   differential pressure measuring means connected across said first and second tubing means for measuring the differential partial pressure between the evolved oxygen and hydrogen during the delivery of said electrolyzing current to said cell.

2. The system as set forth in claim 1 and wherein said selectively permeable means is an ion permeable membrane.

3. The system as claimed in claim 1 wherein said anode enclosure and said cathode enclosure are arranged in a side-by-side relationship with a common wall therebetween, said common wall having said communicating port therein.

4. The system as set forth in claim 1 wherein said anode enclosure and cathode enclosure are nested concentric cylinders with a fluid receiving space therebetween.

5. The system as set forth in claim 1 wherein said first fluid admitting means in said cell means includes a standpipe means,
   first valve means coupling said standpipe to said anode enclosure for filling said anode enclosure to the level indicated on said standpipe and
   second valve means arranged to connect said standpipe means to a source of a test fluid.

6. The system as set forth in claim 1 wherein said pressure measuring means includes means for compensating the operation of said pressure measuring means for a temperature change of the test fluid sample in said anode enclosure and for a temperature change of the reference fluid in said cathode enclosure.

7. The system as set forth in claim 6 wherein said compensating means includes a first fluid-tight bulb having a liquid therein and being immersed in the test fluid sample in said anode enclosure,
   a first capillary tube connecting a vapor pressure developed by said liquid to said differential pressure measuring means,
   a second fluid-tight bulb having a liquid therein and being immersed in the reference fluid in said cathode enclosure and
   a second capillary tubing connecting a vapor pressure developed by said liquid in said second bulb to said differential pressure measuring means, said first capillary tubing being connected to said differential pressure measuring means to eliminate the effect of a temperature change of said test fluid sample in said anode compartment and said second capillary tubing being connected to said differential pressure measuring means to eliminate the effect of a temperature change of said reference fluid in said cathode enclosure.

8. The system as set forth in claim 1 and said second fluid admitting means includes a valve means arranged to be connected to a source of the reference fluid, said valve means being connected to said cathode enclosure to selectively admit a reference fluid from said source to said cathode enclosure.

9. The system as set forth in claim 1 and including selectively operable valve means for draining said test fluid sample from said anode compartment after completion of a test thereon.

* * * * *